April 21, 1953        E. M. MAY        2,635,931
ROTARY JOINT WITH FLUID SEAL
Filed April 29, 1950
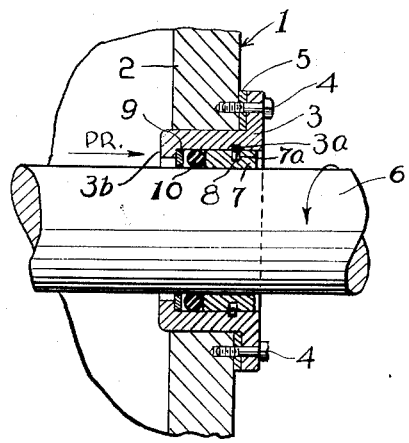
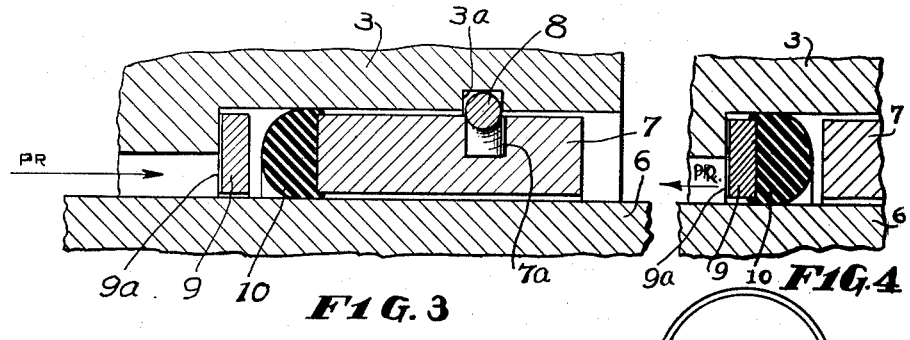
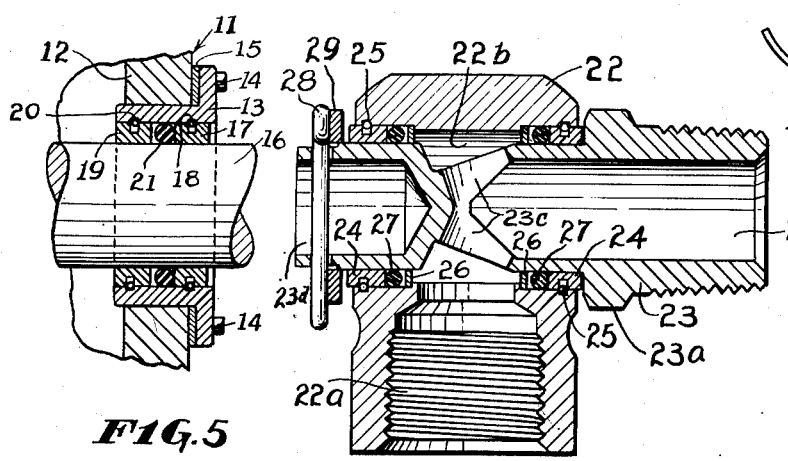
INVENTOR.
BY Edward M. May
Gehr & Leonard
ATTORNEYS.

Patented Apr. 21, 1953

2,635,931

UNITED STATES PATENT OFFICE 2,635,931

ROTARY JOINT WITH FLUID SEAL

Edward M. May, Detroit, Mich.

Application April 29, 1950, Serial No. 159,088

4 Claims. (Cl. 308—36.1)

This invention relates to structures having rotary joints sealed against passage of fluids.

It is an object of the invention to provide such a joint characterized by simplicity of construction, ease and low cost of manufacture, and long life.

More specifically, it is an object of the invention to provide a rotary joint constructed in a manner to permit successful use of rubber sealing means of the O ring type.

Heretofore, O ring seals have been used with marked success for packing reciprocating and rotationally oscillating joints but, as far as is known, they have not been satisfactorily used in joints having continuous rotation in one direction. Study of specimens of the latter type of joints, made of transparent material, has revealed that the rubber of the O ring bunches up on one side of the shaft member as it rotates and stretches out correspondingly on the other side; and this bunching of the rubber progresses around the shaft, carrying the ring with it at approximately half the speed of the shaft rotation. This results in a shearing of the ring over the sharp corner of the shaft groove in which it is mounted and usually in serious leaking of the joint after only a few hundred revolutions of the shaft.

The present invention, which overcomes the difficulty last referred, consists in a novel rotary sealed joint so constructed that the rubber O ring employed is locked by fluid pressure to the part of the joint that presents a sharp corner to the ring so that relative rotation between the ring and such sharp corner is prevented, while a free non-destructive rotational movement between the ring and other parts of the joint is secured.

By way of further explanation of the invention, reference is had to the accompanying drawing showing some examples of the many possible forms of construction in which the invention can be embodied.

In the drawings,

Fig. 1 is a fragmentary axial sectional view of an apparatus having a chambered structure, a rotary shaft extending through the wall of the structure, and one form of the improved joint interposed between the wall and shaft.

Fig. 2 is a side elevation of a snap ring employed in the joint of Fig. 1.

Fig. 3 is a sectional view showing a portion of the structure shown in Fig. 1, greatly enlarged for clarity of disclosure.

Fig. 4 is a sectional view showing a portion of the structure shown in Fig. 3 with the O ring subject to fluid pressure directed inward instead of outward.

Fig. 5 is an axial sectional view showing a modified form of the joint illustrated in Fig. 1.

Fig. 6 is a sectional view illustrating the application of the invention to a pipe or tube joint which is suitable for either back and forth swiveling movement of the parts or for continuous rotational movement of one of the parts.

Referring in detail to the structures shown in the drawing, and first to that shown in Figs. 1, 2, and 3, the numeral 1 designates generally a chambered structure, such, for example, as a crank or gear case, of which but a small portion is shown. This structure, which will be considered to be subject interiorly to either super-atmospheric or subatmospheric pressure, comprises a fluid-tight wall 2 and a flanged liner 3 formed to fit an aperture through the wall. Bolts 4 secure the outer flange of the liner to wall 2 with an interposed gasket 5 which renders the joint between the wall and liner fluid tight.

A shaft 6 is disposed rotatably in the bore of liner 3, but with a clearance to accommodate bearing and fluid seal devices which are believed to be of novel character. These devices comprise a sleeve 7 having running or sliding fits, interiorly with shaft 6 and exteriorly with the bore of liner 3. Sleeve 7 must be secured, preferably disengageably, against movement axially relative to either the structure or the shaft 6. In the construction shown, the sleeve is so secured to liner 3 of structure 1 by means of resilient snap ring 8, the sleeve 7 being formed with a circumferential groove 7a of sufficient depth to fully receive the ring when it is compressed, while the liner 3 has an interior groove 3a of a depth to only partially receive the ring when it expands.

Also interposed between the bore of liner 3 and shaft 6 is a flat washer 9, disposed with its inner side against the inturned flange 3b of liner 3. Like sleeve 7, the washer 9 has a free running fit with the bore of the liner 3 and the surface of shaft 6. The washer preferably has its inner side formed with a plurality of shallow radial grooves 9a which can be formed by coin pressing.

Finally, an O ring of rubber, or the like, is disposed between the sleeve 7 and the washer 9, the cross-sectional dimensions of the O ring, in accordance with the usual practice, being slightly greater than the clearance between the shaft and the liner, so that the ring cross-section is changed from circular to elliptical shape when the ring is assembled in the clearance.

With the construction shown in Figs. 1 to 3, assuming the interior of structure 1 is subject to super-atmospheric pressure (as indicated by the lower straight arrow in Fig. 1), and that the shaft 6 is driven continuously in one direction (as indicated by the curved arrow in Fig. 1), the seal devices function in a manner which will best be understood from a consideration of Fig. 3. By reason of the fluid pressure within the structure 1, the O ring is subjected to such pressure in outward axial direction with the result that the ring is forced toward the adjacent end of sleeve 7 and flattened against it in the manner indicated in Fig. 3. This is made possible by the fact that the space normally unoccupied between the O ring and the sleeve is vented to the atmosphere through the running-fit clearances between the outer surface of the sleeve and the bore of liner 3 and between the inner surface of the sleeve and the shaft 6. The rubber of the O ring tends to extrude slightly into the clearances, and to avoid undue extrusion, the clearances should not exceed about 0.005". Clearances of 0.001" to 0.005" have been found satisfactory. The flattening of the O ring against sleeve 7 has the effect of frictionally locking the two parts together. Furthermore, the fluid pressure, transmitted from the O ring to the sleeve 7, locks the latter, through snap ring 8, to liner 3 because the pressure of the sharp corner of the sleeve groove 7a against snap ring 8 and the resulting pressure of the other side of the snap ring against the sharp corner of the groove 3a of the liner sets up strong frictional resistance to relative rotational movements of the three parts. The frictional connection of the parts 3 and 7 through the snap ring 8 is supplemented by the frictional engagement of the periphery of the O ring 10 with the sleeve 3. It is true that the inner side of the O ring also frictionally engages the shaft 6, but the area of the peripheral engaging surface of the O ring is substantially greater than the area of its inner surface engaging the shaft so that the predominant effect of the two engagements is to tie sleeve 7 to the liner 3. The result of the described action is that relative rotational movement between the rubber ring and metal corners that might cut the rubber is wholly avoided, and relative sliding engagement between the rubber ring and metal parts is limited to a small area of the shaft surface. Consequently, the seal withstands prolonged continuous rotational service without serious deterioration or leakage.

Where the apparatus which has been described operates with a partial vacuum within the chambered body, the seal devices function in a manner analogous to the operation described above. In the case of the vacuum, the unbalanced atmospheric pressure forces the O ring inward against the washer 9 and the latter against the shoulder 3b. As a result, the rubber ring 10 is flattened against adjacent flat surface of the washer 9 in the manner indicated in Fig. 4. This frictionally locks the rubber ring 10 to the washer 9 and, since the washer has firm frictional engagement with the flange 3b, the ring 10 is effectively held from turning relative to the liner 3, and thus functions as a seal without deterioration, for the reasons already pointed out in connection with Fig. 3.

It will readily be appreciated that the invention can be embodied in a wide variety of structural forms. For example, the type of construction illustrated in Figs. 1 to 3 can be modified as shown in Fig. 5 by employing two bearing sleeves in place of the one sleeve and washer utilized in Fig. 1. In Fig. 5, the chambered structure 11 has its wall 12 bored to receive liner 13 which is secured by bolts 14 with interposed gasket 15, as in the first described construction. Interposed between the liner 13 and the rotary shaft 16 are sleeve 17, secured by snap ring 18, and sleeve 19, secured by snap ring 20, and rubber O ring 21 is disposed in the space between the two sleeves.

With the sleeves 17 and 19 engaging the liner 13 and shaft 16 with clearances of 0.001" to 0.005", the modified construction functions substantially in the same manner as that first described. This construction, using two sleeves of substantial width, has advantages where more substantial bearing loads are involved.

The construction shown in Fig. 6 of the drawing further illustrates the adaptability of the invention to various forms and types of apparatus, the invention, in this case, being embodied in a fluid-conducting pipe joint. Here the part corresponding to the chambered structure in Fig. 1 takes the form of a fitting 22 having an internally threaded bore 22a adapted to be connected to a threaded pipe section and a transverse bore 22b disposed at right angles to the bore 22a.

The mating fitting 23 has externally cylindrical parts disposed within the bore 22b of fitting 22 for relative rotation of the two parts. Member 23 is formed at one end with taper screw threads for attachment to either a conduit section or the apertured wall of some chambered structure. Adjacent the screw threads, the member is formed with a hexagonal part 23a to permit use of a wrench to effect such attachment of the member. The member 23 has a through passage comprising an axial section 23b and two branch sections 23c which are disposed at an obtuse angle, preferably 120°, to the axial passage 23b. The branch passages communicate with the interior chamber of fitting 22 to provide a continuous passage through the assembled members.

The transverse bore 22b of member 22 is counter-bored at each end, and between these counterbores and the cylindrical sections of member 23 are arranged rotary seal means of the character shown in Figs. 1 and 3. Each of these seals comprises a sleeve member 24 disengageably secured in the counterbore by means of expandable snap ring 25, a washer 26 of the same character as washer 9 in the first-described construction, and an O ring packing 27. As in the first-described construction, the sleeves 24 and washers 26 are fitted to members 22 and 23 with clearances of from 0.001" to 0.005".

Members 22 and 23 are disengageably secured in the assembled relation shown by resilient dowel pin 28 and washer 29. To avoid undue weight, the blank end of member 23 is bored out at 23d.

A pipe joint such as shown in Fig. 6 may be used in wide variety of ways, including uses that involve continuous relative rotation of the members 22 and 23, as well as conventional swivel joint uses. The construction of the joint member 23 with axial passage 23b and branch passages 23c diverging from the axial passage at an obtuse angle as shown has been found to be advantageous in that it provides a free large-capacity flow for a given size of joint.

The improved seal construction has structural advantages as well as functional advantages. While it is desirable that the joint member which turns in relation to the O ring shall be formed of hardened steel with highly polished surfaces for the O rings to bear on, the other joint member may be made of a variety of material such as aluminum for lightness, brass for corrosion resistance, etc. The seal sleeve members, which are advantageously made of bearing metal, are small enough to permit the use of such material without undue cost.

The speed at which the improved seal can be operated depends upon lubrication and temperature. For example, if oil at not over 140° F. is forcing through the joint under 1000 p. s. i. and the shaft is of approximately $5/8''$ in diameter, a speed of 1000 R. P. M. can be expected with perfect tightness of the seal. In addition, the slip-fitted sleeves permit easy assembly of the parts, and, at the same time, provide the necessary venting of the O ring channel or groove. It is possible to use other forms of construction to provide the venting, but, in view of the difficulty and cost of drilling the necessarily small holes for venting purposes, the slip-fitted sleeves are much to be preferred for this purpose.

The marked advantage of the improved seal will be apparent from the fact that while a prior conventional construction, such as is shown in Fig. 7, will develop serious leakage after a few hundred revolutions, seals made in accordance with the present invention have been run over ten million revolutions before wearing the O ring to a point of slow leakage.

While several alternative forms of apparatus embodying the invention have been shown and described, it is to be understood that these are merely exemplary and that various modifications of the constructions illustrated may be made within the bounds of the claimed invention.

What is claimed is:

1. In a bearing and fluid seal device for chambered structures which in use are subject to different fluid pressures inside and outside their chamber walls, the combination of a first body forming at least part of a chamber wall, said body being formed with a circular bore; a rotatable second body having a circular part disposed concentrically in the bore of the first body, the diameter of the circular part of the second body being considerably smaller than the bore of the first body to provide an annular space of considerable radial extent between the circular surfaces of the two bodies; an annular bearing sleeve fitted in the said annular space with running clearances between the two bodies and the sleeve which are pervious to the passage of fluid under pressure; a resilient O ring packing disposed in the said annular space adjacent one end of the bearing sleeve; means interposed between the first body and the bearing sleeve for opposing axial and rotational movement of the sleeve in the bore of the first body; and rigid means in the bore of the first body for limiting axial movement of the O ring away from the bearing sleeve.

2. A device as claimed in claim 1 in which the means for limiting axial movement of the O ring away from the bearing sleeve comprises a part separate from the first body and the second body.

3. A device as claimed in claim 1 in which the means for limiting axial movement of the O ring away from the bearing sleeve is in the form of a rigid annular washer.

4. A device as claimed in claim 1 in which the means for limiting axial movement of the O ring away from the bearing sleeve is itself a separately formed bearing sleeve.

EDWARD M. MAY.

References Cited in the file of this patent

UNITED STATES PATENTS

| Number | Name | Date |
|---|---|---|
| 873,476 | Woods | Dec. 10, 1907 |
| 1,425,268 | Massa | Aug. 8, 1922 |
| 1,930,586 | Delaval-Crow | Oct. 17, 1933 |
| 2,390,445 | Mercier | Dec. 4, 1945 |
| 2,401,379 | Smith | June 4, 1946 |
| 2,492,006 | Raybould | Dec. 20, 1949 |

FOREIGN PATENTS

| Number | Country | Date |
|---|---|---|
| 573,048 | Great Britain | 1945 |